United States Patent
Matsunaga

(10) Patent No.: US 7,015,430 B2
(45) Date of Patent: Mar. 21, 2006

(54) AUTOMOTIVE ELECTRIC HEATER APPARATUS

(75) Inventor: Ken Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/798,931

(22) Filed: Mar. 11, 2004

(65) Prior Publication Data
US 2004/0178188 A1 Sep. 16, 2004

(30) Foreign Application Priority Data
Mar. 12, 2003 (JP) .............................. 2003-066599

(51) Int. Cl.
*H05B 1/02* (2006.01)
(52) U.S. Cl. ..................... 219/481; 219/505; 219/517
(58) Field of Classification Search ............... 219/481, 219/497, 517, 519, 505, 501, 494
See application file for complete search history.

(56) References Cited

U.S. PATENT DOCUMENTS

| | | | |
|---|---|---|---|
| 4,394,639 A | * | 7/1983 | McGalliard ................ 337/292 |
| 5,408,579 A | * | 4/1995 | Hunt ........................ 392/498 |
| 5,928,538 A | * | 7/1999 | Thivet ....................... 219/264 |

FOREIGN PATENT DOCUMENTS

| | | | |
|---|---|---|---|
| GB | 2091980 | * | 8/1982 |
| GB | 2086698 | * | 12/1982 |
| JP | 2002-324653 | | 11/2002 |

* cited by examiner

*Primary Examiner*—Mark Paschall
(74) *Attorney, Agent, or Firm*—Harness, Dickey & Pierce, PLC

(57) ABSTRACT

An electric heater apparatus for automobiles is disclosed. A sheathed heater (14a) constituting a heat generating member of a heater assembly (14) generates heat by power supplied from a main power supply for generating a DC high voltage through an inverter. A thermal fuse (15) has a temperature detecting element (15a) (low-melting alloy) adapted to fuse when a set temperature is reached. The temperature detecting element (15a) is connected to the power circuit of the sheathed heater (14a) through lead wires (15b, 15c). The thermal fuse (15) is arranged in such a position that the longitudinal direction of the temperature detecting element (15a) accommodated in the casing (17) is coincident with the longitudinal direction of the heater assembly 14, and mounted in surface-to-surface contact with the body (aluminum body (14c)) of the heater assembly (14). Also, the interior of the casing (17) is sealed with a material (such as cement or a silicon caulking material) higher in heat conductivity than air.

17 Claims, 4 Drawing Sheets

AUTOMOTIVE ELECTRIC HEATER APPARATUS

BACKGROUND OF THE INVENTION

1. Field of the Invention

The present invention relates to an automotive electric heater apparatus utilizing a high voltage power supply of 200 V to 400 V DC.

2. Description of the Related Art

Automotive vehicles such as a fuel cell-powered vehicle, an electric car and a hybrid car with little waste heat are designed to employ an electric heater as a heating system by using a high-voltage power supply together with a thermal fuse for protecting the electric heater (Japanese Unexamined Patent Publication No. 2002-324653).

The thermal fuse, as shown in FIGS. 4A, 4B, includes a temperature detecting element 120 (low-melting alloy) connected to an electric heater 110 through lead wires 100. A ceramic container 130 accommodating the temperature detecting element 120 is inserted into an insulating tube 140 together with the lead wires 100, and the insulating tube 140 is mounted in contact with an aluminum body 150 of the electric heater 110. In the case where the electric heater 110 is abnormally overheated, heat is transmitted from the aluminum body 150 to the lead wires 100 in the insulating tube 140, and when the temperature detecting element 120 which has received the heat from the lead wires 100 reaches a set temperature, the thermal fuse fuses and turns off the power circuit of the electric heater 110.

In the thermal fuse described above, however, only a peripheral part of the insulating tube 140 is in contact with the surface of the aluminum body 150 of the electric heater 110 as shown in FIG. 4B and, therefore, the contact area between the insulating tube 140 and the aluminum body 150 is very small. Also, an air layer (an air layer in the insulating tube 140) low in heat conductivity in the path of the heat transmitted from the aluminum body 150 to the lead wires 100 causes a considerable length of time to be consumed before the temperature detecting element 120 blows (the thermal fuse has a low temperature sensitivity). As a result, the surface temperature of the aluminum body 150 increases greatly (to, say, 400° C. or higher) before the temperature detecting element 120 actually fuses, thereby posing a safety problem.

Also, in the thermal fuse shown in FIGS. 4A, 4B, the two lead wires 100 connected to the temperature transducer 120 are led out in opposite directions. Therefore, a harness (not shown) connected to one of the lead wires 100 is required to be laid in U-turn form, and the resulting detour-connection of harness reduces the working efficiency.

SUMMARY OF THE INVENTION

This invention has been achieved in view of the situation described above, and the object thereof is to provide an automotive electric heater apparatus in which the temperature sensitivity of the thermal fuse is improved, for a higher safety, while, at the same time, improving the connection of the harness to the lead wires of the thermal fuse.

According to one aspect of the invention, there is provided an automotive electric heater apparatus comprising an electric heater, for generating heat with power supplied from a high voltage power supply of 200 V to 400 V DC, and a thermal fuse including a temperature detecting element connected in series to the electric heater through lead wires, wherein the temperature detecting element is adapted to blow and turn off the power circuit of the electric heater when the electric heater is abnormally overheated, and wherein the thermal fuse includes a casing accommodating the temperature detecting element and the lead wires therein and mounted on the body surface of the electric heater, and the interior of the casing is sealed with a material higher in heat conductivity than air.

In this configuration, as described above, the interior of the casing accommodating the temperature detecting element and the lead wires is sealed with a material higher in heat conductivity than the air. As compared with a case in which the interior of the casing is filled with air, therefore, the temperature sensitivity of the thermal fuse is improved and, when the electric heater is abnormally overheated, therefore, the temperature detecting element fuses within a shorter time. As a result, in the case where the electric heater is abnormally overheated, the temperature detecting element fuses and turns off the power circuit of the electric heater at an early time to assure a higher safety.

Also, the periphery of the temperature detecting element and the lead wires is fixedly covered with a material high in heat conductivity. Should the casing be broken, therefore, the lead wires (blown portion) are not exposed and the power circuit of the electric heater is positively turned off when the temperature detecting element fuses.

According to another aspect of the invention, there is provided an automotive electric heater apparatus comprising an electric heater, for generating heat with power supplied from a high voltage power supply of 200 V to 400 V DC, and a thermal fuse including a temperature detecting element connected in series to the electric heater through lead wires, wherein the temperature detecting element is adapted to fuse and turn off the power circuit of the electric heater when the electric heater is abnormally overheated, and wherein the thermal fuse includes a casing accommodating the temperature detecting element and the lead wires therein and mounted on the body surface of the electric heater, the casing is arranged in such a manner that the longitudinal direction of the temperature detecting element coincides with the longitudinal direction of the electric heater, and one of the lead wires connected to an end of the temperature detecting element is bent in the shape of U in the casing and led out in the same direction as the other lead wire connected to the other end of the temperature detecting element.

In this configuration the two lead wires connected to the temperature detecting element are led out of the casing in the same direction. Therefore, the harness connected to the lead wires is not required to be laid in U-turn fashion, thereby improving the harness connection for an improved working efficiency.

As the thermal fuse is of such a type that the longitudinal direction of the temperature detecting element is arranged in the longitudinal direction of the electric heater, the width of the casing can be reduced as compared with the type in which the lead wires are led out in the direction at right angles to the temperature detecting element. Thus, the casing is not exposed outside the body of the electric heater and can be arranged efficiently.

According to still another aspect of the invention, there is provided an automotive electric heater apparatus, wherein the casing of the thermal fuse is arranged in such a manner that the longitudinal direction of the temperature detecting element coincides with the longitudinal direction of the electric heater, and one of the lead wires connected to an end of the temperature detecting element is bent in the shape of U in the casing and led out in the same direction as the other lead wire connected to the other end of the temperature detecting element.

In the automotive electric heater apparatus according to this invention, a material containing ceramic or cement, as a main component having a higher heat conductivity than air, can be used.

In the automotive electric heater apparatus according to this invention, the casing is mounted in surface-to-surface contact with the body of the electric heater.

With this configuration, as compared with the prior art (Japanese Unexamined Patent Publication No. 2002-324652) in which an insulating tube is arranged in contact with the body surface of the electric heater, the contact area between the casing and the body surface of the electric heater is increased and, therefore, the temperature sensitivity of the thermal fuse increases. In the case where the electric heater is abnormally overheated, the temperature detecting element fuses and turns off the power circuit of the electric heater earlier for a further improved safety.

In the automotive electric heater apparatus according to this invention, the casing of the thermal fuse is fixed on the body of the electric heater through a bracket.

The thermal fuse according to the invention is not fixed by solder or the like on a control board, for example, but on the body of the electric heater through a bracket which is screwed and securely fixed.

The present invention may be more fully understood from the description of preferred embodiments of the invention, as set forth below, together with the accompanying drawings.

DESCRIPTION OF THE PREFERRED EMBODIMENTS

Next, an embodiment of the invention will be explained with reference to the accompanying drawings.

Figure 1A:
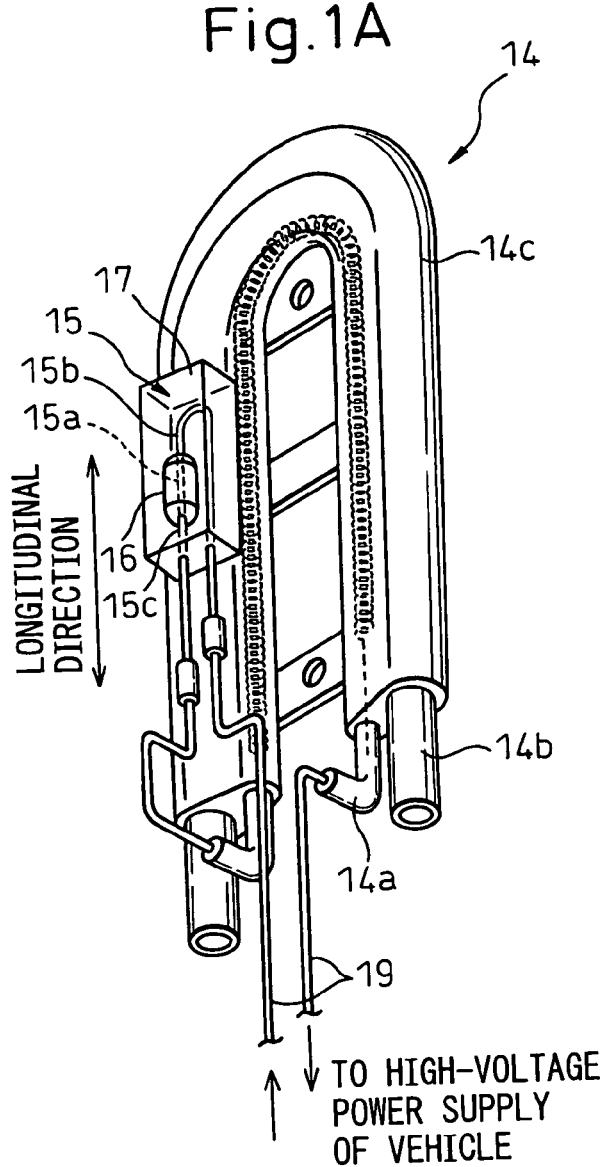
FIG. 1A is a perspective view of an electric heater apparatus having a thermal fuse, and FIG. 1B a sectional view of a heater assembly.
Figure 3:
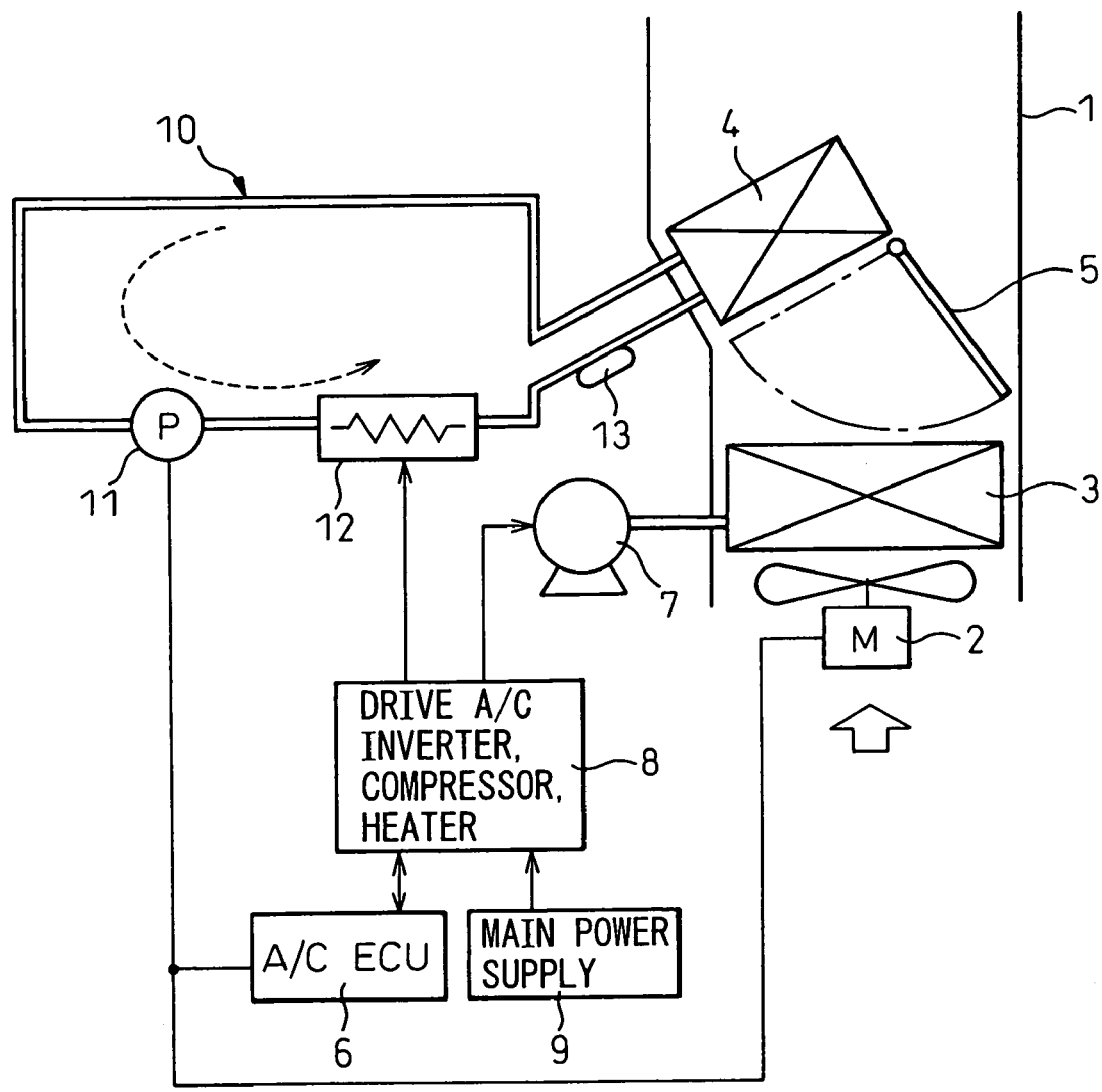
FIG. 3 is a schematic diagram showing a configuration of an air conditioning system.
Figure 4A:
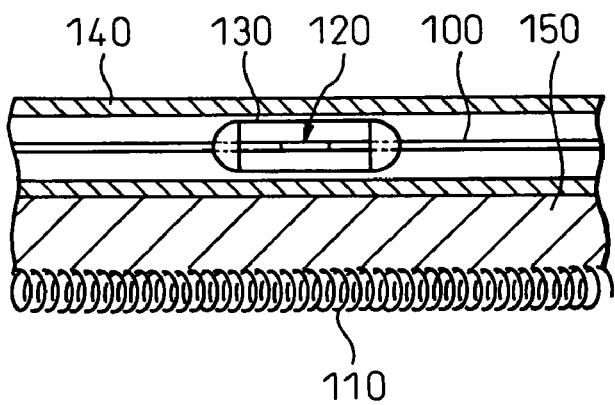
FIGS. 4A, 4B are a diagram for explaining the prior art.
Figure 4B:
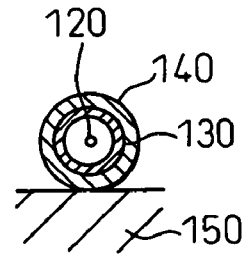

This embodiment represents an example of application of the electric heater apparatus according to the invention to the air conditioning system of a fuel cell-powered vehicle driven with an electric motor as a power source. FIG. 1A is a perspective view of the electric heater apparatus, and FIG. 3 a schematic diagram showing a configuration of the air conditioning system.

The air conditioning system includes a duct 1 for introducing the air into the passenger compartment, a blower 2 for introducing and supplying the air from inside or outside the passenger compartment into the duct 1, an evaporator 3 and a heater core 4 arranged in the duct 1, and an air mix door 5 for adjusting the temperature of the air blown into the passenger compartment. The air conditioning system is controlled by an electronic control unit (ECU) 6.

The evaporator 3 is a well-known heat exchanger used in a refrigeration cycle and cools the blown air by exchanging heat with a low-temperature refrigerant supplied by the operation of a compressor 7.

The compressor 7 is driven by an AC motor, and the rotational speed of the AC motor (i.e. the amount of the refrigerant discharged from the compressor 7) is controlled by the ECU 6 through an inverter 8. The inverter 8 is supplied with DC current from a main power supply 9 (the high voltage power supply according to the invention) mounted on the vehicle. The main power supply 9 is charged by a fuel cell not shown and generates a high voltage of 200 V to 400 V DC.

The heater core 4 is arranged downstream of the evaporator 3 along the air flow in the duct 1, is connected with a cooling water circuit 10, and heats the blown air by exchanging heat with the hot water flowing in the heater core 4.

The cooling water circuit 10 includes a pump 11 for circulating the cooling water, an electric heater apparatus 12 according to the invention for heating the cooling water, and a water temperature sensor 13 for detecting the temperature of the cooling water supplied to the heater core 4.

The air mix door 5 is arranged rotatably between a position of the lowest temperature (position indicated by dashed line in FIG. 3) where the air inlet side of the heater core 4 is closed up and a position of the highest temperature (position indicated by solid line in FIG. 3) where the detour circuit of the heater core 4 is closed up. The air mix door 5 thus adjusts the ratio between the air passing through the heater core 4 and the air detouring the heater core 4 (the air flowing in the detour circuit) thereby to change the blown air temperature.

The air adjusted in temperature by the air mix door 5 is blown into the passenger compartment by way of an air outlet (not shown) selected in accordance with the air outlet mode.

Next, the electric heater apparatus 12 is explained.

Figure 1B:
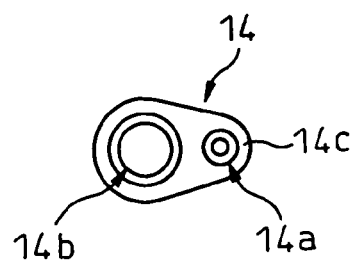

The electric heater apparatus 12 comprises, as shown in FIGS. 1A, 1B, a heater assembly 14 for heating the cooling water, and a thermal fuse 15 constituting a protection device of the heater assembly 14.

The heater assembly 14, as shown in FIG. 1B, is configured of a sheathed heater 14a making up a heat generating member embedded in an aluminum body 14c together with a hot water pipe 14b.

The sheathed heater 14a is connected to the inverter 8 and heated by the power supplied from the main power supply 9 through the inverter 8.

The duty cycle of the power supplied to the sheathed heater 14a is controlled by the ECU 6 through the inverter 8 in such a manner that the cooling water temperature detected by the water temperature sensor 13 is held at a predetermined level (say, 80° C. at maximum).

The hot water pipe 14b has an end thereof connected to the outlet of the pump 11, and the other end thereof connected to the hot water inlet of the heater core 4, thus constituting a part of the cooling water path.

The thermal fuse 15 includes a temperature detecting element 15a (low-melting alloy) adapted to fuse when a set temperature (say, 180° C.) is reached. The temperature detecting element 15a is connected to the power circuit of the sheathed heater 14a through two lead wires 15b15c. (Specifically, the lead wire 15b is connected to the inverter 8, and the other lead wire 15c is connected in series with the sheathed heater 14a.)

The thermal fuse 15 has a casing 17 for accommodating the temperature detecting element 15a encased in the insulating container 16 and the two lead wires 15b, 15c.

The lead wire 15b connected to an end of the temperature detecting element 15a is bent in the shape of U in the casing 17 and, together with the other lead wire 15c connected to the other end of the temperature detecting element 15a, is led out in the same direction from one side of the casing 17.

Figure 2:
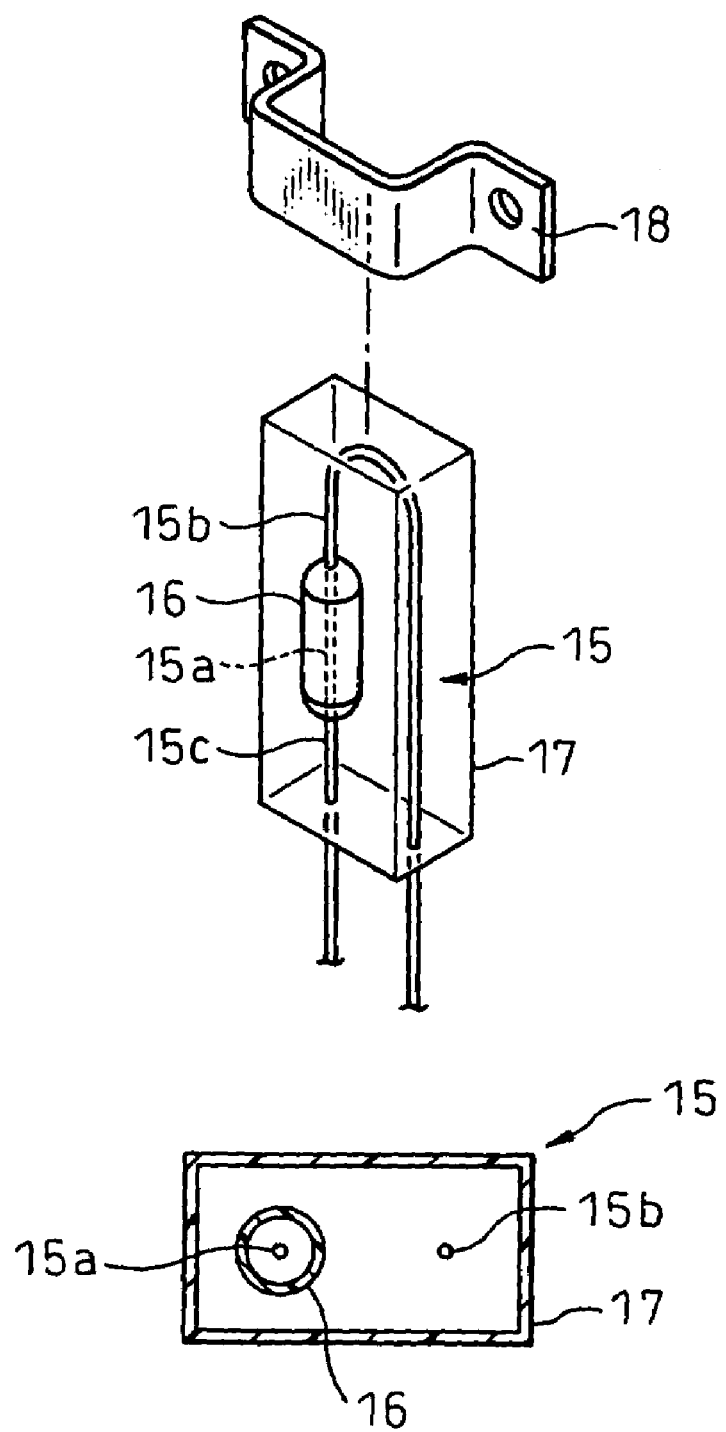
FIG. 2 is a perspective view showing a method of fixing the thermal fuse and is a sectional view of a casing accommodating a temperature detecting element.

The casing 17 is formed of an insulating material, such as a ceramic, high in heat conductivity and is screwed, through a bracket 18 (FIG. 2), to an aluminum body 14c of the heater assembly 14. The casing 17, as shown in FIG. 1A, is arranged so that the longitudinal direction of the temperature detecting element 15a is coincident with the longitudinal direction of the heater assembly 14 and is mounted in surface contact with the body of the heater assembly 14.

Also, the interior of the casing 17 is sealed (filled up) with a material being higher in heat conductivity than air and having stiffness capable of enduring breaking energy when the thermal fuse 15 is fused (such as cement or a silicon caulking agent).

As described above, the electric heater apparatus 12 has the interior thereof sealed with a material having a higher heat conductivity than air. Therefore, heat is transmitted more quickly from the body surface of the heater assembly 14 through the lead wires 15b, 15c to the temperature detecting element 15a. The casing 17, which is formed of a ceramic high in heat conductivity, is mounted in surface contact on the body of the heater assembly 14, and, therefore, the thermal resistance thereof is reduced. As a result, the temperature sensitivity of the thermal fuse 15 is improved. As compared with the prior art (Japanese Unexamined Patent Publication No. 2002-324653), therefore, the temperature detecting element 15a fuses within a shorter time when the sheathed heater 14a is abnormally overheated. The earlier fusing of the temperature detecting element 15a turns off the power circuit of the sheathed heater circuit 14a earlier. Thus, the surface temperature of the heater assembly 14 (the surface temperature of the aluminum body 14c) is prevented from increasing excessively (say, 400° C. or higher) thereby to assure an improved safety.

The interior of the casing 17 is sealed with a material high in heat conductivity (i.e. the surroundings of the insulating container 16 and the lead wire 15b are fixed by a material high in heat conductivity), as described above. Should the casing 17 be broken, therefore, the temperature detecting element 15a which may fuse is not exposed to the exterior. Thus, the fused part of the temperature detecting element 15a is kept out of contact with the body surface of the heater assembly 14 and prevented from being grounded. In this way, the power circuit of the sheathed heater 14a can be turned off safely and positively.

Further, the lead wire 15b of the thermal fuse 15 connected to an end of the temperature detecting element 15a is bent in the shape of U in the casing 17, and together with the other lead wire 15c connected to the other end of the temperature detecting element 15a, is led out in the same direction from one side of the casing 17. As shown in FIG. 1A, therefore, the harness 19 connected to the lead wires 15b, 15c is not required to be laid in U-turn fashion. Thus, the connection of the harness 19 is improved for an improved working efficiency.

Also, in view of the fact that the length of the temperature detecting element 15a is arranged along the length of the heater assembly 14, the width of the casing 17 (horizontal width in FIG. 2) can be reduced as compared with the thermal fuse of the type in which the lead wires are led in the direction at right angles to the temperature detecting element. As a result, the casing 17 can be arranged in an efficient way without being exposed from the heater assembly 14.

The bracket 18 for fixing the casing 17 of the thermal fuse 15 to the heater assembly 14 may be fixed by other than the screw (by a clamp, for example).

According to this embodiment, the electric heater apparatus 12 according to the invention is applied to the air conditioning system of the fuel cell-powered vehicle. Nevertheless, the electric heater apparatus 12 according to the invention may be used for the heating system of other vehicles (such as an electric car and a hybrid car), with little waste heat, with equal effect.

While the invention has been described by reference to specific embodiments chosen for purposes of illustration, it should be apparent that numerous modifications could be made thereto by those skilled in the art without departing from the basic concept and scope of the invention.

The invention claimed is:

1. An automotive electric heater apparatus comprising an electric heater for generating heat with power supplied from a high voltage power supply, and a thermal fuse including a temperature detecting element connected in series to the electric heater through lead wires, the temperature detecting element fusing and turning off the power circuit of the electric heater when the electric heater is abnormally overheated, wherein the thermal fuse includes a casing accommodating the temperature detecting element and the lead wires therein and mounted on a body surface of the electric heater, and the interior of the casing is filled up with a material being higher in heat conductivity than air;

the casing of the thermal fuse is arranged in such a manner that the longitudinal direction of the temperature detecting element coincides with the longitudinal direction of the electric heater, and one of the lead wires connected to an end of the temperature detecting element is bent in the shape of U in the casing on a plane generally parallel to the body surface of the electric heater and led out in the same direction as the other lead wire connected to the other end of the temperature detecting element; and the casing is mounted in surface-to-surface contact with the body of the electric heater.

2. An automotive electric heater apparatus according to claim 1, wherein said material having a higher heat conductivity than air contains ceramic or cement as a main component.

3. An automotive electric heater apparatus according to claim 1, wherein the casing of the thermal fuse is fixed on the body of the electric heater through a bracket.

4. An automotive electric heater apparatus according to claim 1, wherein the temperature detecting element is encased in an insulating container.

5. An automotive electric heater apparatus according to claim 4, wherein the insulated container and the lead wires are fixed in place by the material being higher in heat conductivity than the air.

6. An automotive electric heater apparatus according to claim 1, wherein the lead wires are fixed in place by the material being higher in heat conductivity than the air.

7. An automotive electric heater apparatus according to claim 1, wherein the material being higher in heat conductivity is disposed between the temperature detecting element and the electric heater.

8. An automotive electric heater apparatus according to claim 1, wherein the electric heater includes a sheathed heater and a hot water pipe, the sheathed heater being arranged adjacent to one of two straight portions of a U-shaped lead wire and the hot water pipe being arranged adjacent to the other of the two straight portions of the U-shaped lead wire, and the temperature detecting element is arranged at a straight portion of the hot water pipe side.

9. An automotive electric heater apparatus according to claim 1, wherein the electric heater includes a sheathed heater and a hot water pipe, both of the sheathed heater and the hot water pipe being embedded in an aluminum body.

10. An automotive electric heater apparatus comprising an electric heater for generating heat with power supplied from a high voltage power supply, and a thermal fuse including a temperature detecting element connected in series to the electric heater through lead wires, the temperature detecting element fusing and turning off the power circuit of the electric heater when the electric heater is abnormally overheated, wherein
the thermal fuse includes a casing accommodating the temperature detecting element and the lead wires therein and mounted on a body surface of the electric heater, the casing is arranged in such a manner that the longitudinal direction of the temperature detecting element coincides with the longitudinal direction of the electric heater, and one of the lead wires connected to an end of the temperature detecting element is bent in the shape of U in the casing on a plane generally parallel to the body surface of the electric heater and led out in the same direction as the other lead wire connected to the other end of the temperature detecting element; and
the casing is mounted in surface-to-surface contact with the body of the electric heater.

11. An automotive electric heater apparatus according to claim 10,
wherein said material higher in heat conductivity than air contains ceramic or cement as a main component.

12. An automotive electric heater apparatus according to claim 10,
wherein the casing of the thermal fuse is fixed on the body of the electric heater through a bracket.

13. An automotive electric heater apparatus according to claim 10, wherein the electric heater includes a sheathed heater and a hot water pipe, the sheathed heater being arranged adjacent to one of two straight portions of a U-shaped lead wire and the hot water pipe being arranged adjacent to the other of the two straight portions of the U-shaped lead wire, and the temperature detecting element is arranged at a straight portion of the hot water pipe side.

14. An automotive electric heater apparatus according to claim 10, wherein the electric heater includes a sheathed heater and a hot water pipe, both of the sheathed heater and the hot water pipe being embedded in an aluminum body.

15. An automotive electric heater apparatus comprising:
an electric heater;
a thermal fuse including a temperature detecting element and a casing accommodating the temperature detecting element and lead wires connecting the temperature detecting element in series with the electric heater; and
a material being higher in heat conductivity than air disposed between the temperature detecting element and the electric heater; wherein
the material is disposed between the lead wires and the electric heater; and
one of the lead wires is bent in the shape of a U in the casing on a plane generally parallel to a body surface of the electric heater.

16. An automotive electric heater apparatus according to claim 15, wherein the electric heater includes a sheathed heater and a hot water pipe, the sheathed heater being arranged adjacent to one of two straight portions of a U-shaped lead wire and the hot water pipe being arranged adjacent to the other of the two straight portions of the U-shaped lead wire, and the temperature detecting element is arranged at a straight portion of the hot water pipe side.

17. An automotive electric heater apparatus according to claim 15, wherein the electric heater includes a sheathed heater and a hot water pipe, both of the sheathed heater and the hot water pipe being embedded in an aluminum body.

* * * * *